US009620948B2

(12) United States Patent
Widegren

(10) Patent No.: US 9,620,948 B2
(45) Date of Patent: Apr. 11, 2017

(54) DEVICE FOR UNWINDING AND WINDING UP ONE OR MORE LINES

(75) Inventor: Michael Widegren, Lugano (CH)

(73) Assignee: IPALCO B.V., Woerden (NL)

(*) Notice: Subject to any disclaimer, the term of this patent is extended or adjusted under 35 U.S.C. 154(b) by 161 days.

(21) Appl. No.: 14/126,647

(22) PCT Filed: Jun. 18, 2012

(86) PCT No.: PCT/EP2012/061604
§ 371 (c)(1),
(2), (4) Date: Apr. 1, 2014

(87) PCT Pub. No.: WO2012/172110
PCT Pub. Date: Dec. 20, 2012

(65) Prior Publication Data
US 2014/0217225 A1 Aug. 7, 2014

(30) Foreign Application Priority Data

Jun. 17, 2011 (LU) .......................................... 91 826

(51) Int. Cl.
H02G 11/02 (2006.01)
B65H 75/44 (2006.01)
G02B 6/44 (2006.01)

(52) U.S. Cl.
CPC ......... H02G 11/02 (2013.01); B65H 75/4449 (2013.01); G02B 6/4457 (2013.01); B65H 2701/33 (2013.01); B65H 2701/34 (2013.01)

(58) Field of Classification Search
CPC . B65H 75/4449; B65H 2701/34; H02G 11/02
(Continued)

(56) References Cited

U.S. PATENT DOCUMENTS 2,141,909 A 12/1938 Hauser
2,518,071 A 8/1950 Rushworth
(Continued)

FOREIGN PATENT DOCUMENTS

DE 830371 2/1952
DE 8522019 11/1985
(Continued)

OTHER PUBLICATIONS

Chinese Office Action dated Feb. 28, 2015 issued in the corresponding Chinese Patent Application No. 2015022500988950 by the Chinese Patent Office. English translation thereof attached hereto.
(Continued)

Primary Examiner — Sang Kim
(74) Attorney, Agent, or Firm — Grogan, Tuccillo & Vanderleeden, LLP

(57) ABSTRACT

The invention relates to a device for unwinding and winding one or more lines for uninterrupted connection of each of the one or more lines between two connection points, it being possible to produce the uninterrupted connection between a fixed first connection point and a second connection point which is at a variable distance or in each case one of a plurality of second connection points which are at different distances. The device comprises a rotatable winding body for unwinding and winding the one or more lines, in that the line(s) is/are guided from the first fixed connection point in a first sub-portion from a stationary first position coaxial with the winding body to a second position opposite the first position and from said second position to a third position which is substantially in one plane with the first position but is rotatable with the winding body, the line(s) in the first sub-portion being guided helically at least in portions. The line(s) is/are then guided from the third position in a second sub-portion to the circumferential side of the winding body (Continued)

and optionally via a number of windings around the winding body to the second connection point.

13 Claims, 1 Drawing Sheet

(58) Field of Classification Search
USPC .......................................... 242/378.4, 388.6
See application file for complete search history.

(56) References Cited

U.S. PATENT DOCUMENTS

| | | |
|---|---|---|
| 3,144,218 A | 8/1964 | Tepe |
| 3,372,887 A | 3/1968 | Ladany |
| 3,545,693 A * | 12/1970 | John et al. ................. 242/388.6 |
| 5,358,190 A | 10/1994 | Fladung |

FOREIGN PATENT DOCUMENTS

| | | |
|---|---|---|
| GB | 691817 | 5/1953 |
| JP | S57-115522 | 1/1981 |
| JP | 58074466 | 5/1983 |
| JP | 1043469 | 2/1989 |
| JP | 6276655 | 9/1994 |
| JP | 2008-245390 | 10/2008 |
| WO | WO9201323 | 1/1992 |

OTHER PUBLICATIONS

Japanese Office Action dated Nov. 30, 2015.

* cited by examiner

DEVICE FOR UNWINDING AND WINDING UP ONE OR MORE LINES

FIELD OF THE INVENTION

The present invention relates in general to devices for unwinding and winding one or more lines for uninterrupted connection between two connection points, in particular "line drums", such as cable drums, hose drums etc.

BACKGROUND OF THE INVENTION

Devices for unwinding and winding one or more lines are generally known, but they have various disadvantages depending on the particular application.

"Cable drums" (actually cable reels) have the disadvantage, for example, that although power is supplied via continuous lines, for the purposes of unrolling or rolling, the connections to the drum have to be disconnected in order to prevent twisting of the connected lines, since the plug connections are connected to the drum and thus also rotate during the winding process.

With "automatic cable reels" or "spring operated cable reels", disconnection of the plug connections during the unwinding and winding operation is unnecessary since connection is achieved within the reel by way of sliprings or sliding contacts. However, due to the underlying principle, this leads to elevated mechanical wear and/or increased susceptibility to soiling. In the case of liquid-conveying lines too, tightness of the rotary joints must be ensured over extended service cycles.

Moreover, it is not always feasible to use sliprings or rotary joints. On the one hand, the use of sliding contacts is out of the question in many fields, for example in signal transmission, since sliding contacts would here lead to significant impairment. On the other hand, such a solution is also technically very complex in cases where a relatively large number of lines or a mixture of a plurality of electrical and liquid-conveying lines have to be linked together reliably via sliprings or rotary joints. Furthermore, it is largely impossible in this case to achieve a compact and/or economical embodiment of the reel.

To get round the use of sliding contacts, solutions are additionally known in which a line is guided continuously over two drums, one being stationary and one rotatable. As the usable part of the line is unwound from the rotatable drum, another part of the line is wound around the stationary drum. Although such solutions do not require any unplugging of the connections during the winding process, in particular winding on the stationary drum often causes problems due to distortion and the formation of loops in the line. Moreover, such devices would appear to be unsuitable for guiding a plurality of lines.

Finally, it would be desirable, with measurement, control and automation technology becoming ever more sophisticated, for it to be possible (optionally even subsequently) to convey data or signal lines in a single device in addition to the conventional application lines.

BRIEF DESCRIPTION OF THE INVENTION

It is accordingly an object of the present invention to provide a device for unwinding and winding one or more lines for uninterrupted connection between two connection points which does not require any disconnection of the lines during the unwinding or winding process and at the same time enables a compact embodiment.

DETAILED DESCRIPTION OF THE INVENTION

Figure 1:
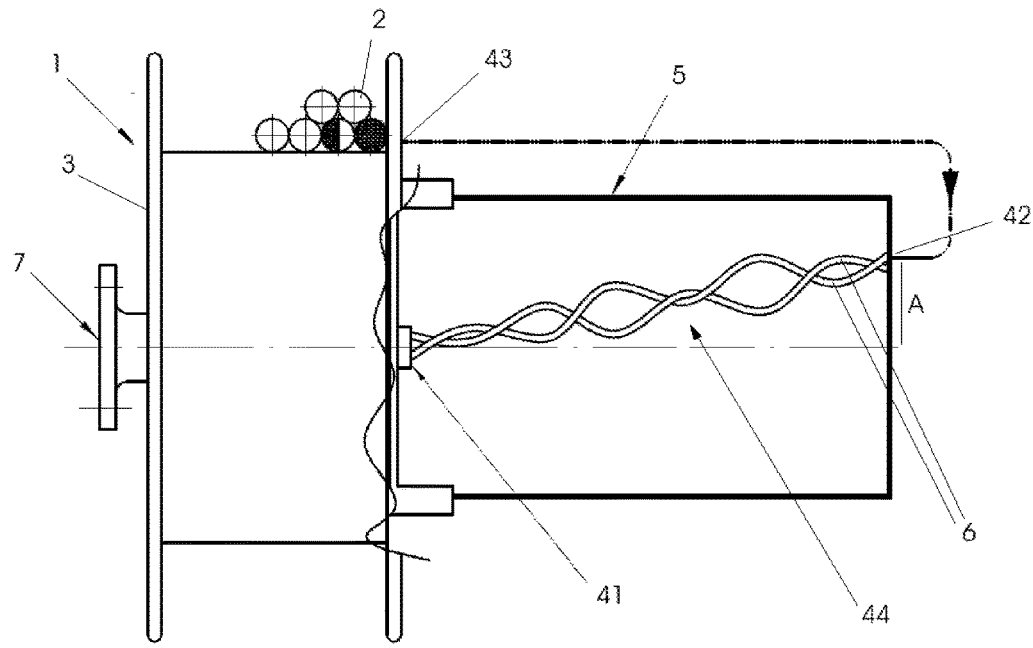
FIG. 1 shows a partial cross-section through one embodiment of the invention and FIG. 2 shows a partial cross-section through a further embodiment of the invention.

An object is achieved according to an embodiment the invention by a device for (at least partial) unwinding and winding of one or more lines for uninterrupted connection of each of the one or more lines between two connection points, it being possible to produce the uninterrupted connection between a fixed first connection point and a second connection point which is at a variable distance or in each case one of a plurality of second connection points which are at different distances. The device comprises a rotatable winding body for unwinding and winding the one or more lines. The line(s) is/are guided from the first fixed connection point in a first sub-portion from a stationary first position which is coaxial with the winding body to a second position opposite the first position and from said second position to a third position which is substantially in one plane with the first position but is rotatable with the winding body. In the first sub-portion, the line(s) is/are guided helically freely at least in portions. The line(s) is/are guided from the third position in a second sub-portion to the circumferential side of the winding body and optionally via a number of windings around the winding body to the second connection point.

The device according to the invention makes it possible to wind and unwind one or more lines in a compact manner, as required, without removing or twisting the connecting lines fastened thereto. The length of the helical portion between a stationary and a rotatable point as a function of the minimum bending radius of the line(s) in principle determines the possible number of revolutions on unwinding and winding.

In practice, unwinding and winding one or more lines means that the lines may in principle be unwound and wound only over a ("usable") part of their full length. This usable part substantially corresponds to the portion of the lines located in the region of the winding body when the lines are wound completely thereon.

For the purposes of the invention, an uninterrupted connection means that the lines within the device are not interrupted by connection elements, such as sliding contacts, rotary joints or the like, but rather extend continuously from the first to the second connection points.

In one embodiment, the line(s) are guided helically (freely in space) between the first and second position. If a plurality of lines are present, these may or may not be firmly connected laterally between the first and second positions and in this way form either one or more helices. Between the second and third position, the line(s) may in this case be firmly fitted to parts of the device, for example to a housing surrounding the first sub-portion.

In a further embodiment of the device, the line(s) is/are additionally guided helically (freely in space) between the second and third positions.

In a further embodiment of the device, the second position is arranged with the winding body rotatable, i.e. it rotates jointly with the winding body during unwinding and winding of the one or more lines.

In a further, preferred embodiment of the device, the second position is arranged to be freely rotatable independently of the winding body. In principle, this method allows the usable length of the helical portions to be doubled in comparison with an embodiment in which the second and third position are rotatable relative to the first position but fixed relative to one another. The particular advantage is that this allows a space-saving embodiment without major effort and that in addition undesired distortion and loop formation are very largely avoided, which significantly increases the reliability and operating robustness of the device even over extended operating cycles.

In a further preferred embodiment of the device, the second position is arranged offset axially relative to the first position. The particular advantage of an eccentric arrangement of the second position relative to the first position is better utilisation of space within the space needed for the helix. In this case, the distance A between the second position and a position coaxial with the first position is preferably selected such that 0.1 d<A<10 d, preferably 0.2 d<A<5 d, very particularly preferably 0.5 d<A<2 d, wherein d is the average (effective) diameter of the helix.

The average (effective) diameter of the winding body (D) determines the length of the unwindable line per revolution, while the average (effective) diameter of the helix (d) for the most part is predetermined by the minimum bending radius of the line(s), and the desired number and diameter of the lines. The average diameter of the winding body (D) is therefore in practice preferably relatively large relative to the average diameter of the line carrier (d), for example 1.1 d<D<100 d or more, preferably 1.5 d<D<50 d, very particularly preferably 2 d<D<25 d.

The width of the line carrier is preferably selected such that at least the desired number of lines may be accommodated. A further advantage of the invention is that it is even possible without major effort subsequently to insert further lines, if the line carrier is of sufficient dimensions.

In a preferred embodiment, the winding body takes the form of a hollow cylinder, preferably a drum. The coaxially arranged flexible line carrier is arranged offset laterally (outside) or, more space-savingly, inside said cylinder.

For the purposes of the invention lines are power-, information-/signal- (e.g. galvanic or optical) or material-conveying lines, for example single- or multi-core electric cables, single- or multi-core optical cables (optical fibres) or single or multiple gas, liquid or solids delivery hoses, etc. In the case of multi-core or multiple lines, the cores or ducts may extend parallel, twisted or coaxially. For the purposes of the present invention, depending on the context the term "line" may denote both the individual "core" and the multi-core or multi-channel line itself, for example a electric cable.

There are thus in principle no limits to guidance of a plurality of lines in the device and the device is therefore very versatile. A plurality of lines may consequently be guided (at least in portions) in a parallel, twisted or coaxial manner or in a mixture of parallel, twisted and/or coaxial manners, depending on the line type or its application. In a preferred device, a plurality of lines are arranged in parallel.

These lines are preferably connected together at least in portions, to simplify handling during the winding operation, for example at least in the windable and unwindable region laterally parallel to one another, such that they form a straight line in the unwound state.

The device 1 shown in FIG. 1, to illustrate the invention, for unwinding and winding one or more lines 2 comprises a rotatable winding body, here in the form of a drum 3. In the variant shown in FIG. 1, the lines lead from a first, fixed connection point 7 in a first sub-portion from a first position 41 via a second position 42 to a third position 43. In the variant shown, the helix 44 is provided between the first 41 and second 42 positions. In FIG. 1, the position 42 is not arranged coaxially with the drum 3, but rather at a distance A. The helix 44 is arranged laterally of the drum 3 and protected by a housing 5. In this case, the housing 5 is fastened to the rotatable drum 3. The cores 6 of the line 2 are guided individually in the region of the helix.

Figure 2:
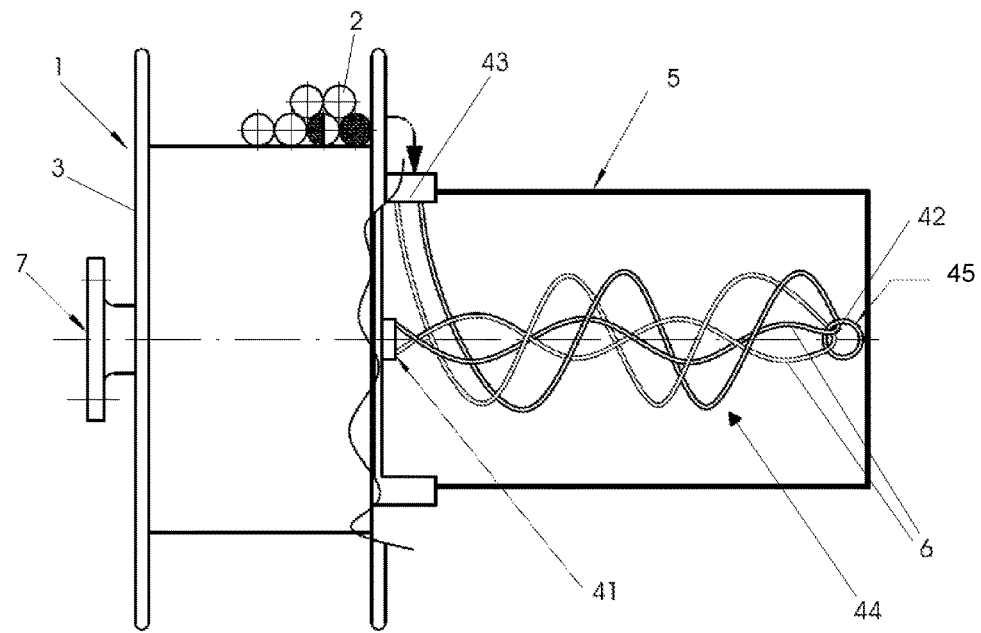

The device 1 shown in FIG. 2, to illustrate the invention, for unwinding and winding one or more lines 2 comprises a rotatable winding body, here in the form of a drum 3. In the case shown, the helix 44 is arranged laterally of the drum 3 and protected by a housing 5. In this case, the housing 5 is fastened to the rotatable drum 3. The cores 6 of the line 2 are guided individually in the region of the helix.

In the variant shown in FIG. 2, the lines lead from a first, fixed connection point 7 in a first sub-portion from a first position 41 via a second position 42 to a third position 43. In the variant shown, the helix 44 is provided between the first 41 and second position 42 and between the second 42 and third position 43. The second position 42 is represented by a hook or, as in FIG. 2, as a ring 45, through which the cores 6 may be passed or fastened. The second position 42 is preferably mounted freely rotatably relative to the housing 5, and can therefore rotate on unwinding and winding. The freely rotatable return point within the double helix in principle allows a similarly high number of revolutions of the drum as for a single helix of twice the length, but significantly reduces the dimensions of the housing 5. On unwinding and winding, the ring 45 rotates at half the angular velocity of the drum 3. Position 42 could also be arranged non-coaxially with the drum 3, as in FIG. 1.

The invention claimed is:

1. A device for unwinding and winding one or more lines for an uninterrupted connection of each of the one or more lines between two connection points, said uninterrupted connection being arrangeable between a fixed first connection point and (a) a second connection point which is at a variable distance, or (b) one of a plurality of second connection points which are at different distances; wherein the device comprises a rotatable winding body for unwinding and winding the one or more lines, wherein the one or more lines are guided from the first fixed connection point in a first sub-portion from a stationary first position coaxial with the winding body to a second position opposite the first position and from said second position to a third position which is substantially in one plane with the stationary first position but is rotatable with the winding body, wherein the one or more lines in the first sub-portion are guided helically between the stationary first position and the second position and between the second position and the third position; wherein the one or more lines are guided from the third position in a second sub-portion to the circumferential side of the winding body and via a number of windings around the winding body to the second connection point; and wherein the second position is arranged to be freely rotatable independently of the winding body.

2. The device according to claim 1, wherein the second position is offset axially relative to the first position.

3. The device according to claim 1, wherein the distance (A) between the second position and a position coaxial with the stationary first position is selected such that 0.1 d <A <10 d, wherein d is the average diameter of the helix.

4. The device according to claim 1, wherein the winding body takes the form of a hollow cylinder or drum.

5. The device according to claim 4, wherein the first sub-portion of the one or more lines is arranged laterally of this hollow cylinder or this drum.

6. The device according to claim 4, wherein the first sub-portion of the one or more lines is arranged within this hollow cylinder or this drum.

7. The device according to claim 1, wherein a plurality of electric and fluid-conveying lines are connected together at least in portions in a parallel, twisted or coaxial manner or in a combination of parallel, twisted and coaxial manners.

8. The device according to claim 1, wherein a plurality of electric or fluid-conveying lines are arranged in parallel.

9. The device according to claim 8, wherein the plurality of lines are connected laterally at least in portions.

10. The device according to claim 1, wherein the average diameter of the helix of the one or more lines d is smaller than the average diameter of the winding body D.

11. The device according to claim 10, wherein 1.1 d <D <100 d.

12. The device according to claim 1, wherein the lines are power-, information-/signal-or material-conveying lines.

13. The device according to claim 12, wherein the lines are single-or multi-core electric cables, single-or multi-core galvanic or optical conductors or single or multiple gas, liquid or solids delivery hoses.

\* \* \* \* \*